Feb. 18, 1930. W. SCHWEYDAR 1,747,651
TORSION BALANCE FOR MEASURING THE GRAVITATION
Filed June 8, 1926
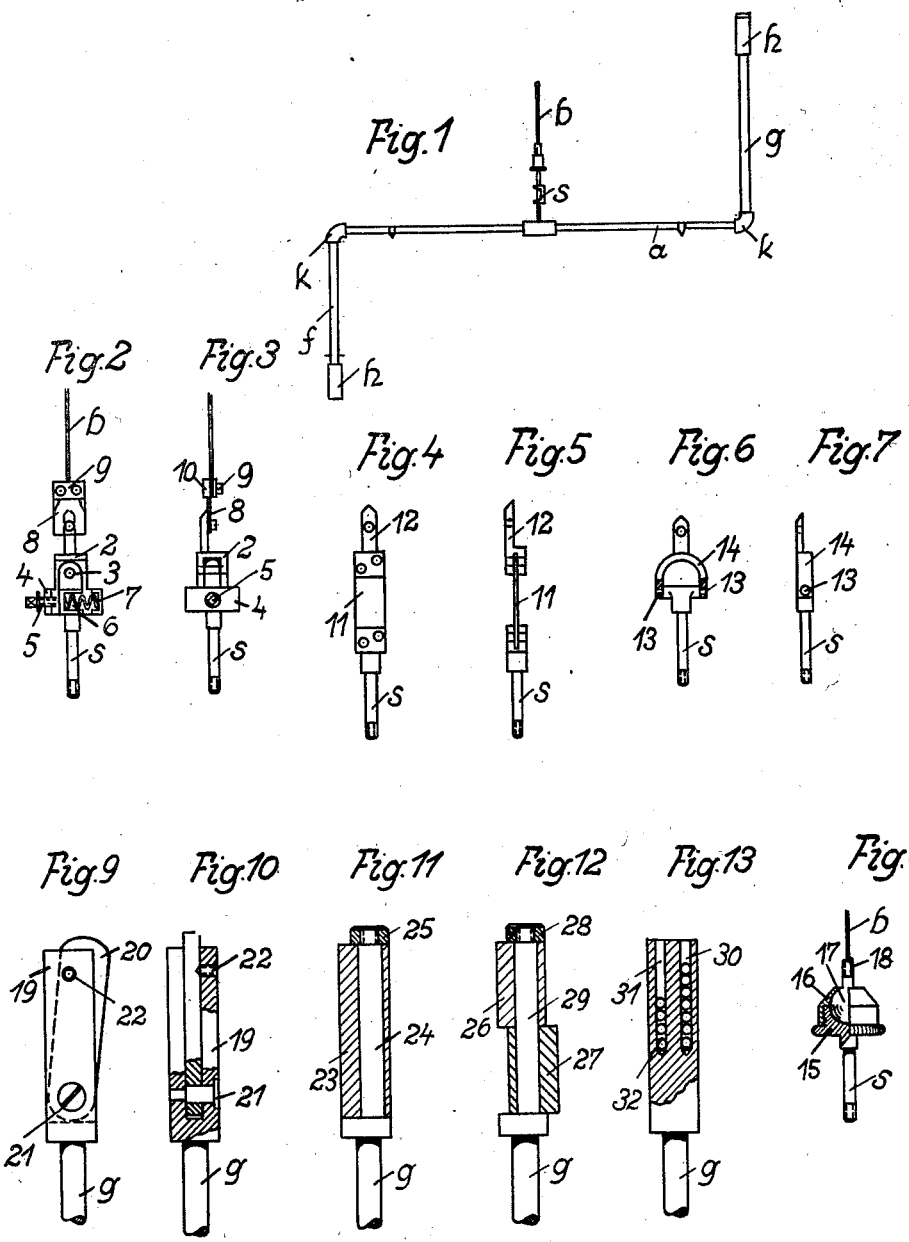
Inventor
Wilhelm Schweydar
by Emil Bonnelycke
attorney Patented Feb. 18, 1930

1,747,651

UNITED STATES PATENT OFFICE

WILHELM SCHWEYDAR, OF POTSDAM, GERMANY, ASSIGNOR TO ASKANIA-WERKE AKTIENGESELLSCHAFT VORMALS CENTRALWERKSTATT DESSAU UND CARL BAMBERG-FRIEDENAU, OF BERLIN-FRIEDENAU, GERMANY

TORSION BALANCE FOR MEASURING THE GRAVITATION

Application filed June 8, 1926, Serial No. 114,577, and in Germany June 11, 1925.

There are already known torsion balances for measuring the gravitation in which the center of gravity of one of the two loading weights of the scale beam is located above the horizontal mid-plane of said beam, whereas the center of gravity of the other loading weight is located in known manner below said plane so that the center of gravity of all suspended members together is located completely or nearly completely in the said plane. The advantage of this arrangement and combination of the parts concerned resides therein that the height of the tripod can be diminished, but it suffers from the drawback that in order to adjust the balance beam attention must be paid not only to the beam being suspended accurately and horizontally, but also to the fact that the two vertical rods which extend upwardly and downwardly and carry the two loading weights cannot tilt around the longitudinal axis of the horizontal beam and contact with the protective casing enclosing it.

The present invention presents a means by which the balance beam is prevented from turning around its own axis, and by which, the vertical rods are prevented from tilting to one or the other side. The invention is illustrated diagrammatically and by way of example on the accompanying drawing on which Fig. 1 is a side view of the balance beam with its rods and torsion wire, and Figs. 2–13 show eight different constructional forms of the improved suspension means embodying the invention, Figs. 2 and 3 show side views of one modification at right angles relatively to each other. Figs. 4 and 5 show another modification, the views being taken at right angles with respect to each other. Figs. 6 and 7 show side views of a third modification. Figs. 9 and 10 show side views of a fourth modification. Fig. 8 shows, partly in side view and partly in axial section, a modification and Figs. 11, 12, and 13 show, in axial section, three further modifications.

The various modifications shown in said Figs. 2–13 may be divided into two groups, the one being formed by those in which the entire suspension system is rotatable around the beam axis (Figs. 2 and 3), and the other by those in which a mass is, or mass parts, are, located otherwise (Figs. 4–13).

Referring to Fig. 1, $a$ is the balance beam which is suspended from the torsion wire $b$, and $f$ and $g$ are vertical rigid rods securely connected with the beam $a$ and extending in opposite directions and carrying the loading weights $h$ and $h$. The beam is attached to the wire by the intermediary of a rod $s$ carrying the mirror S the upper end of which rod $s$ is provided with a clamping device for the wire.

In the following the several constructional forms of the invention as shown by way of example are described. In Figs 2 and 3 $s$ denotes that portion of the mirror-carrying rod which is located above the mirror; and it is suspended from an inverted U-shaped member 2 by means of a cross-pin 3 on which it may swing. The legs of the member 2 are provided with horizontal plates 4 and 7 of which 4 carries a screw 5, the inner end of which bears against one side of the head of the rod $s$, whereas the plate 7 contacts with one end of a helical spring 6 located in a bore of said head, whereby this latter and the screw 5 are held in contact with each other. The member 2 is provided with an upwardly directed extension, by means of which it is connected with a flat spring 8 provided with a rigid head plate 10 to which another plate 9 is attached by small screws, as shown in Fig. 2. These plates serve for clamping the device to the torsion wire $b$. In order to adjust the balance in such a manner that the rods $f$ and $g$ are directed accurately vertically the rod $s$ will be turned correspondingly upon the pin 3.

In the constructional forms shown in Figs. 4–13 the accurate adjustment is effected by using the weight of the beam $a$ (Fig. 1) for causing the mirror rod $s$ (Fig. 1) to hang vertically, and by then turning the rods $f$ and $g$ together with the beam to locate a mass.

This is effected in Figs. 4 and 5 by the insertion of an elastic lamella 11 which is attached at its upper end to the thread clamping member 12 and at its lower end to the head of the rod $s$. The thread is clamped fast with the aid of a clamping plate like 9 in Figs. 2 and 3, including the screws.

In the modification shown in Figs. 6 and 7 a hinge or joint is substituted for the lamella 11 of Figs. 4 and 5. The head of the rod *s* is provided with lateral pivots 13, the axis of which lies parallel to the beam *a*. The pivots 13 engage a forked member 14 provided with the clamping means for the wire.

In Fig. 8 the head of the rod *s* forms a supporting member 15 for a ball 17 retained in its place in the member 15 by a screw cap 16 having a central aperture through which projects an upwardly directed extension of the said ball. That extension is so designed as to be adapted to serve as a clamping means for the wire *b*.

Owing to the insertion of a hinge or joint between the mirror rod and the torsion wire, the said rod will adjust itself vertically under the effect of the weight of the beam, but if it is found thereafter that the rods *f* and *g* (Fig. 1) are not exactly vertical this can be effected by locating a mass otherwise. This can be done, for instance, by turning the rods on the beam at the bent portions *k* (Fig. 1) or by turning the beam with said rods around its axis at its place of support in the mirror rod *s*.

If the parts *a*, *f*, and *g* (Fig. 1) consist of aluminum tubes, the beam *a* and the rods *f* and *g* may be connected with each other by knees *k*, as in Fig. 1, which allow of a certain slight turning on the beam, or this latter and said rods may be firmly connected with each other and a sleeve serving as carrier for the beam and allowing of a certain slight turning thereof may be secured to the mirror rod.

Other means for otherwise locating a mass are shown in Figs. 9–13.

In the constructional form shown in Figs. 9 and 10 the upper end of the rod *g* is so designed as to form a fork 19, the legs of which enclose an adjusting plate 20 which can be adjustably rotated on a pin 21 and secured in its adjusted position by a screw 22. It is obvious that the center of gravity can be located otherwise by turning the plate 20 more or less to one or the other side. The screw 22 may be dispensed with if the pivot 21 is so designed as to be able to serve as a clamping screw.

In Fig. 11 the upper loading weight of the rod *g* is formed by a cylindrical member 23 having an eccentric bore enclosing an eccentrically located pin 24 projecting upwards from the rod *g* and being provided with a nut 25 for securing the member 23 in its adjusted position. The center of gravity can obviously be located otherwise by turning the member 23 on the pin 24.

A similar constructional form is shown in Fig. 12 in which there are two cylindrical members 26 and 27 with eccentric bores located on one pin 29. This modification permits a still more accurate adjustment than that shown in Fig. 11. 28 denotes the nut provided on the pin 29 for securing the adjusting members in position after the adjustment.

Finally, Fig. 13 shows a modification in which the body forming the loading weight of or for the rod *g* has two vertical bores 30 and 31 containing each a certain number of shot balls 32, of which one or more may be transferred from one bore into the other, as required for the adjustment.

It will be obvious to every expert that still other modifications may be designed for locating the point of gravity otherwise. I wish it to be understood that I claim also such other modifications as falling within the scope of my invention, and I wish it to be understood furthermore that any one of all modifications may be employed also in connection with the rod *f* (Fig. 1) or with both rods (*f* and *g*), and that the respective constructional forms may be used also in connection with the beam instead of with any one of said rods, provided, that their object is to otherwise locate the point of gravity.

By inserting a hinge or joint into the mirror rod I intend to prevent the torsion wire from bending at the place or point of clamping. If the wire is clamped exactly centrically a hinge or joint may be dispensed with.

The devices described are intended for use chiefly in connection with torsion balances having a Z-shaped beam (like *f*, *a*, and *g* in Fig. 1), but the invention can be employed also in connection with ordinary torsion balance beams in order to adjust them horizontally, that is to say, to compensate any possibly existing difference between the loading weights.

I claim:

1. A torsion balance for measuring gravitation, comprising, a torsion wire; a balance beam; loading weights and connecting structure for attaching the beam to the torsion wire; a mirror rod; a suspension member inserted between the torsion wire and said rod and comprising a flexible joint; a spring located in said joint and being so arranged as to tend to press the head of said rod laterally; and an adjusting member located in the said suspension member and adapted to move the said head counter to said spring.

2. A torsion balance for measuring gravitation, comprising, a torsion wire; a balance beam and loading weights; a plurality of rods having said weights attached thereto and being attached to said beam; connecting structure for attaching the beam to its torsion wire; and means permitting the said rods to be turned relatively to the beam.

3. A torsion balance for measuring gravitation, comprising, a torsion wire; a balance beam and loading weights; rods having said weights attached thereto and being attached to said beam; connecting structure for attaching the beam to its torsion wire; and means permitting the said beam to be turned around its own axis together with said rods.

4. A torsion balance for measuring gravitation, comprising, a torsion wire; a balance beam; and loading weights and connecting structure for attaching the beam to the torsion wire; said structure comprising a mirror rod and a flexible joint connecting the rod with the torsion wire.

5. A torsion balance for measuring gravitation, comprising, a torsion wire; a balance beam; and loading weights and connecting structure for attaching the beam to the torsion wire, said structure comprising a mirror rod and an elastic lamella connecting the rod with the torsion wire.

6. A torsion balance for measuring gravitation, comprising, a torsion wire; a balance beam; and loading weights and connecting structure for attaching the beam to the torsion wire, said structure comprising the mirror rod and a pivot joint connecting the said rod with the torsion wire.

7. In a torsion balance for measuring gravitation, comprising a torsion wire; a balance beam and loading weights and connecting structure for attaching the beam to the torsion wire; a mirror rod; and means inserted into the mirror rod adapted to locate the center of gravity of said beam and weights.

In testimony whereof I have affixed my signature.

WILHELM SCHWEYDAR.